United States Patent [19]

Abrams

[11] Patent Number: 5,399,227
[45] Date of Patent: Mar. 21, 1995

[54] COMPOSITE EYEGLASS LENS LAMINATING HOLDER

[76] Inventor: Herbert M. Abrams, 168 Bennington Hill Ct., West Henrietta, N.Y. 14586

[21] Appl. No.: 80,808

[22] Filed: Jun. 22, 1993

Related U.S. Application Data

[63] Continuation-in-part of Ser. No. 945,491, Sep. 16, 1992, abandoned.

[51] Int. Cl.⁶ .................... B32B 31/04; B32B 31/20; C03C 27/12; G02B 27/00
[52] U.S. Cl. ........................ 156/539; 156/99; 156/538; 156/556; 156/580; 356/127
[58] Field of Search .............. 269/266; 359/819; 356/127; 51/277; 156/99, 103, 106, 108–109, 295, 538–539, 556, 580–581, 583.3, 272.2, 273.7, 275.5, 275.7, 379.8, 583.91; 351/159, 177; 264/1.1, 1.7, 1.8; 65/37, 42–43

[56] References Cited

U.S. PATENT DOCUMENTS

| | | | |
|---|---|---|---|
| 1,122,247 | 12/1914 | Biegel | 51/277 X |
| 2,394,721 | 2/1946 | Simmons et al. | 156/99 X |
| 2,618,200 | 11/1952 | Clave et al. | |
| 2,807,982 | 10/1957 | McLeod | 356/127 |
| 3,002,285 | 10/1961 | Wright | 356/127 |
| 3,242,581 | 3/1966 | Wagener | 356/127 X |
| 3,322,598 | 5/1967 | Marks et al. | |
| 3,858,982 | 1/1975 | Meckler | 356/127 |
| 4,096,023 | 6/1978 | Bivens | |
| 4,474,355 | 10/1984 | Greshes | |
| 4,865,670 | 9/1989 | Marks | |
| 4,927,480 | 5/1990 | Vaughan | |
| 5,181,344 | 1/1993 | Joncour et al. | 51/277 X |

FOREIGN PATENT DOCUMENTS

| | | | |
|---|---|---|---|
| 1391064 | 4/1975 | United Kingdom | 356/127 |

*Primary Examiner*—Adrienne Johnstone
*Attorney, Agent, or Firm*—Eugene Stephens & Associates

[57] ABSTRACT

Front and rear lenses of a composite eyeglass lens are laminated together by holding the front lens in an X, Y adjustable stage on a laminating axis, holding the rear lens in a predetermined position relative to the laminating axis, and moving the two lenses together on the laminating axis to spread an adhesive between them. The rear lens holder is rotatable around a laminating axis and has an adjustable center foot adhesively tacked to the rear lens and an array of surrounding pressure feet for pressing the rear lens uniformly against the front lens in a process that can be observed by the operator. Then, the adhesive between the pressed-together lenses is cured by UV radiation directed through the front lens before the lenses are removed from the laminator.

16 Claims, 7 Drawing Sheets

COMPOSITE EYEGLASS LENS LAMINATING HOLDER

RELATED APPLICATIONS

This application is a continuation-in-part of parent application Ser. No. 945,491, filed Sep. 16, 1992, entitled LAMINATION OF COMPOSITE EYEGLASS LENSES, now abandoned.

TECHNICAL HELD

This invention involves lamination or bonding together of front and rear lenses forming a composite eyeglass lens.

BACKGROUND

Composite eyeglass lenses have been formed by bonding together front and rear lenses, as suggested in U.S. Pat. No. 2,618,200. A device and method for accomplishing this has been suggested in U.S. Pat. No. 4,927,480. Generally, the bonding process involves placing a curable adhesive on the concave interface surface of the front lens; pressing the convex interface surface of the rear lens against the adhesive in the front lens, to spread the adhesive throughout the space between the two lenses; and curing the adhesive to bond the lenses together, forming a composite lens, which is then trimmed to fit within an eyeglass frame.

Especially when the desired composite lens includes a cylindrical component that must be properly oriented to correct for astigmatism and a bifocal or progressive focal region that must be properly positioned for reading purposes, the existing methods and equipment have fallen short of the desired optical accuracy. Existing laminating equipment, for example, does not readily accommodate eccentric positioning and bonding of the front and rear lenses, which can be necessary in some cases. Also, existing methods and equipment have been inconvenient to operate and have put the desirable accuracies beyond practical reach for some composite eyeglass lenses.

I have discovered new and better ways of mounting, aligning, and bonding together composite eyeglass lenses to improve on the accuracy attainable. I have also discovered an improved way of mounting the rear lens on a holder and distributing holder pressure over the rear face of the rear lens, for evenly pressing it against the front lens and an intervening layer of adhesive during the bonding process. My method, practiced with my preferred apparatus, is also faster and more convenient, is easier to work, and produces fewer defects in bonded composite lenses.

SUMMARY OF THE INVENTION

My composite lens laminating system includes a front lens platform on a movable stage and a rear lens holder that is rotationally adjustable on a laminating axis and is movable along the laminating axis to press the rear lens against the front lens. Accurate positioning of each lens is assured by an X, Y adjustment of the stage holding the front lens platform, by an arrangement of locating pins and pressure feet that register and hold the rear lens on its holder, and rotational adjustment of the rear lens holder on the laminating axis. A simple and effective arrangement assures that the two lenses are pressed together with uniform pressure that spreads the adhesive evenly between them, and this process can be observed through the rear lens while the pressure is being applied. Then, the bonding adhesive is cured while the two lenses are pressed together so that the accuracy of their positioning and the lack of any interruption in the adhesive layer are preserved during the curing process. Several specific procedures and structures contribute to achieving these effects; and the result is fast, effective, and more accurate than previous systems.

Among the specific procedures and structures is a mounting tool for aligning and adhering a rear face of the rear lens to a tacky adhesive surface of a center foot and transferring the center foot to a holder that includes an array of pressure feet around the center foot. This arrangement is preferably adjustable to distribute holder pressure evenly over the rear surface of the rear lens during the bonding process.

DETAILED DESCRIPTION

Figure 6:
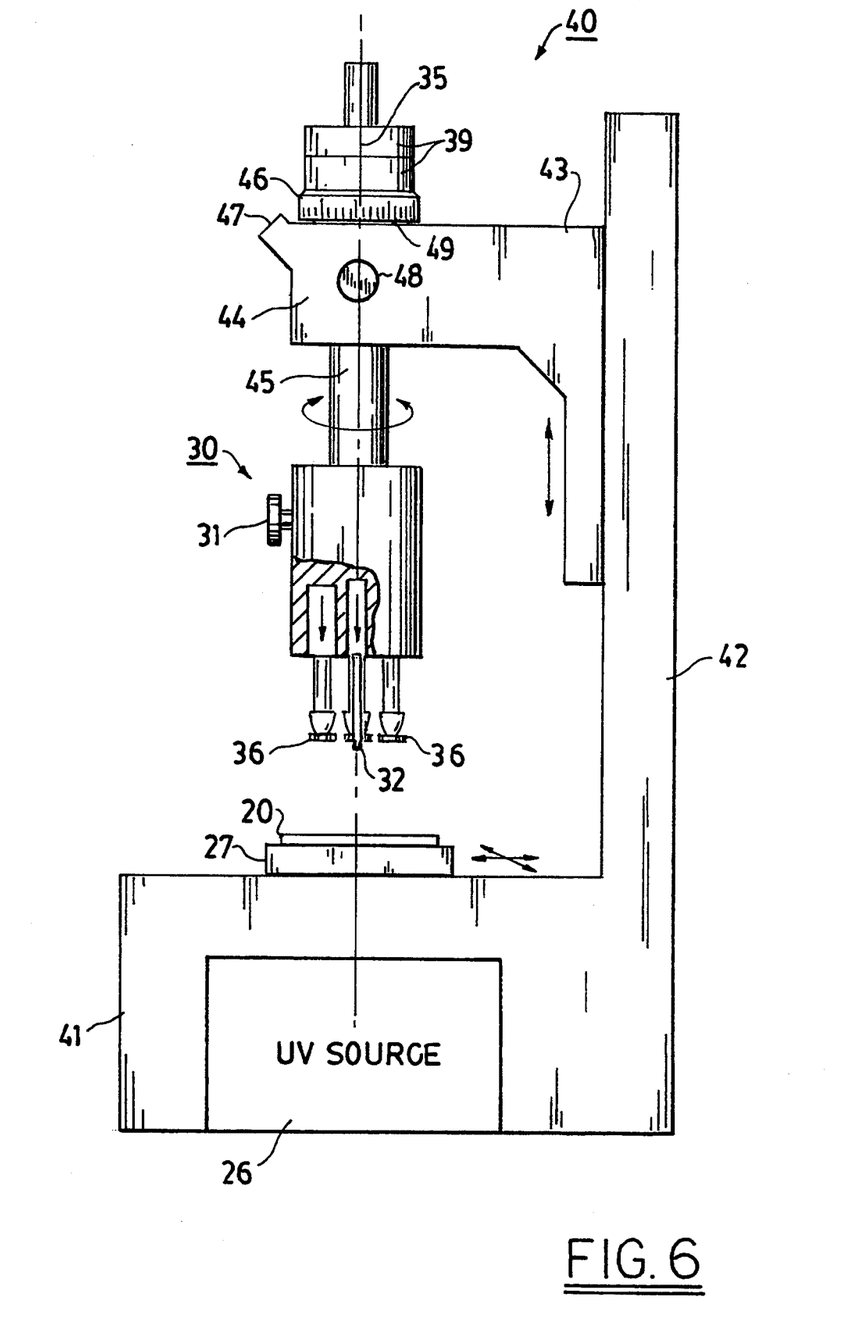
FIG. 6 is a partially schematic, elevational view of a preferred device for laminating composite eyeglass lenses according to my invention.
Figure 7:
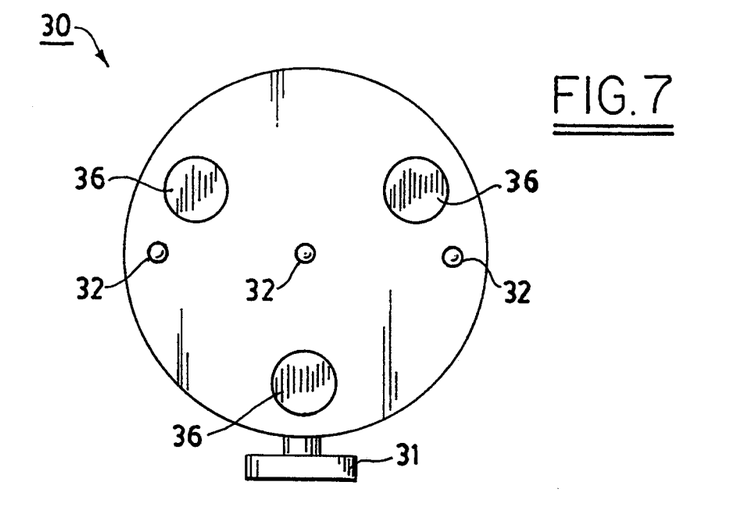
FIG. 7 is a partially schematic, plan view of a rear lens holder detached from the laminator of FIG. 6.
Figure 8:
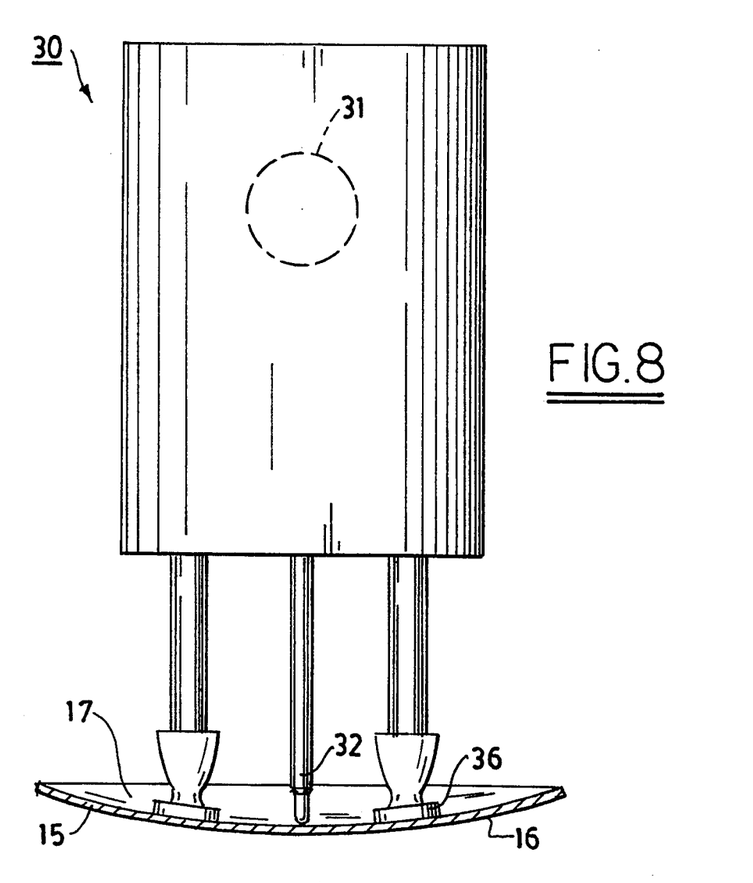
FIG. 8 is a partially schematic and partially cutaway elevational view of the holder of FIG. 7 supporting a rear lens for lamination.
Figure 9:
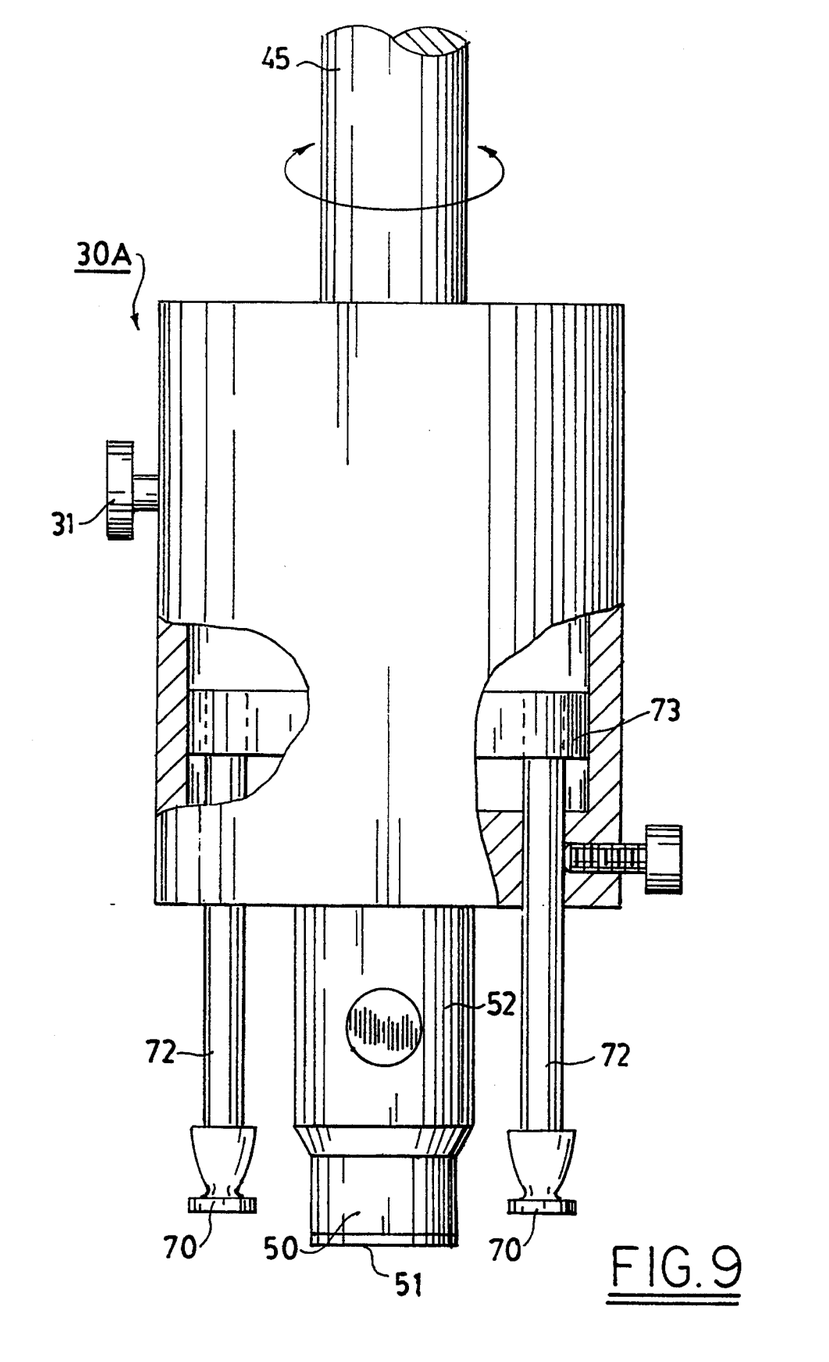
FIG. 9 is a partially schematic and partially cutaway elevational view of a preferred embodiment of rear lens holder according to my invention.
Figure 10:
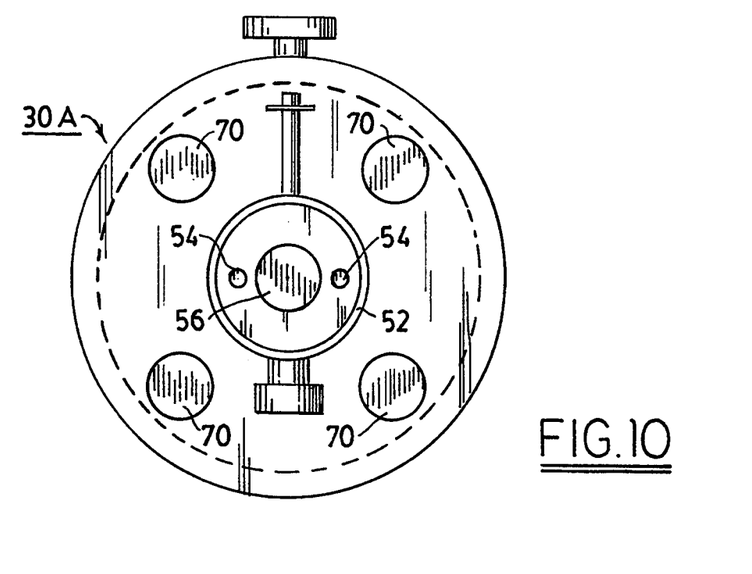
FIG. 10 is a bottom view of the holder of FIG. 9 with a center foot removed.
Figure 11:
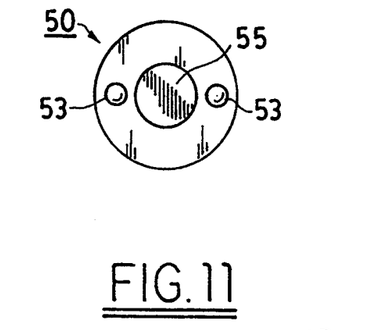
FIG. 11 is a top view of a center foot usable with the holder of FIGS. 9 and 10.
Figure 12:
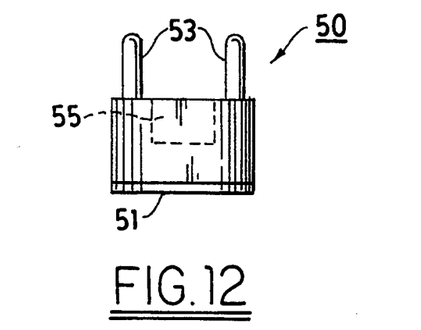
FIG. 12 is a side elevational view of the center foot of FIG. 11.

My laminating system aims at accurately bonding together a front lens 10 and a rear lens 15, as shown in FIGS. 1-5. Preferred equipment for doing this is shown in FIGS. 6-8, and a preferred lens holder and tool for mounting the rear lens on the holder are shown in FIGS. 9–18. Lenses 10 and 15 are preferably molded in standard circular shapes with a variety of surface configurations so that a specific pair of a front lens 10 and a rear lens 15 can be bonded together to fulfill the desired optical requirements.

Figure 1:
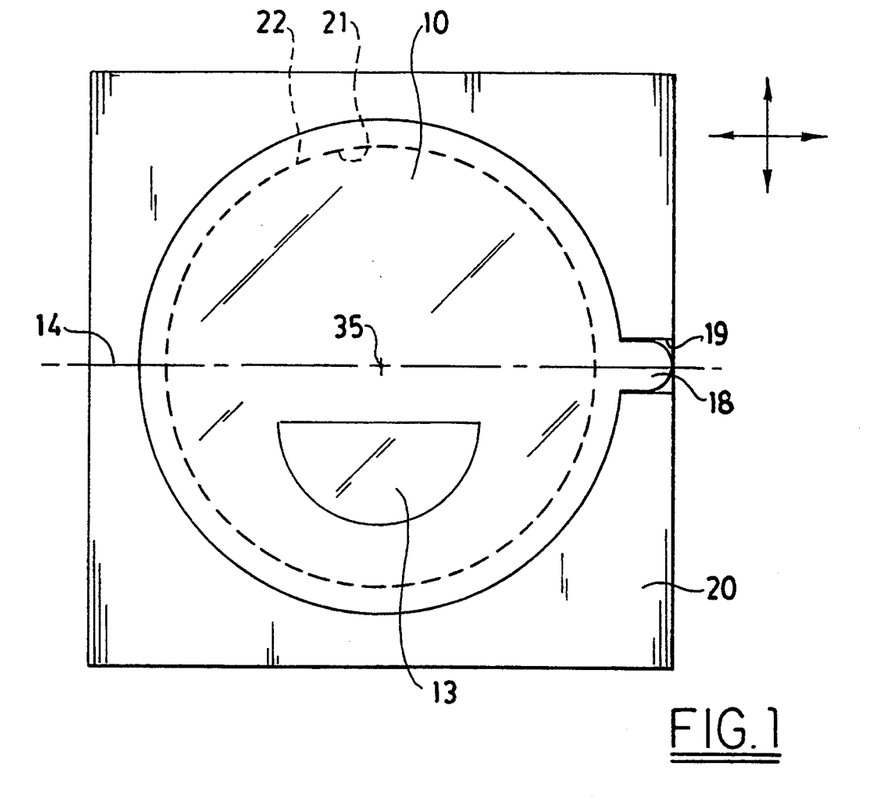
FIG. 1 is a plan view of a platform supporting a front lens for lamination according to my invention.
Figure 2:
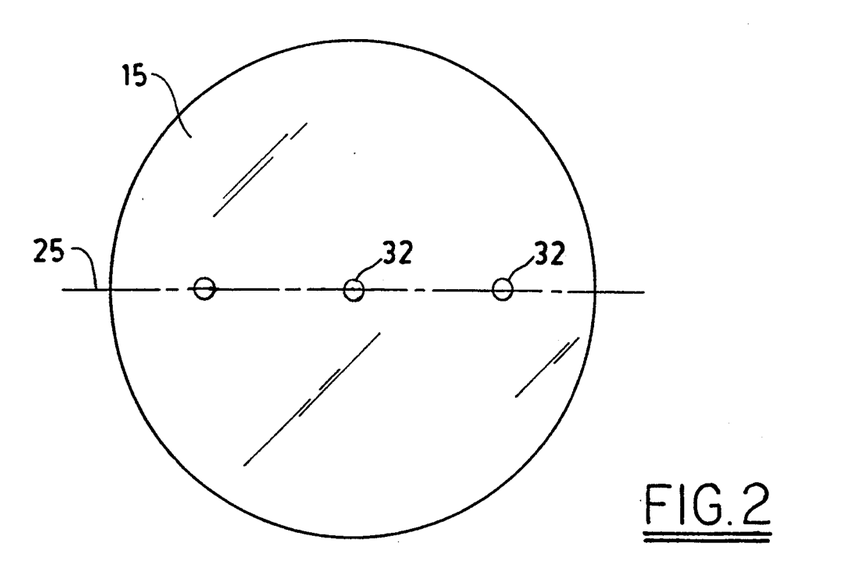
FIG. 2 is a plan view of a rear lens marked for positioning and bonding to the front lens.
Figure 3:
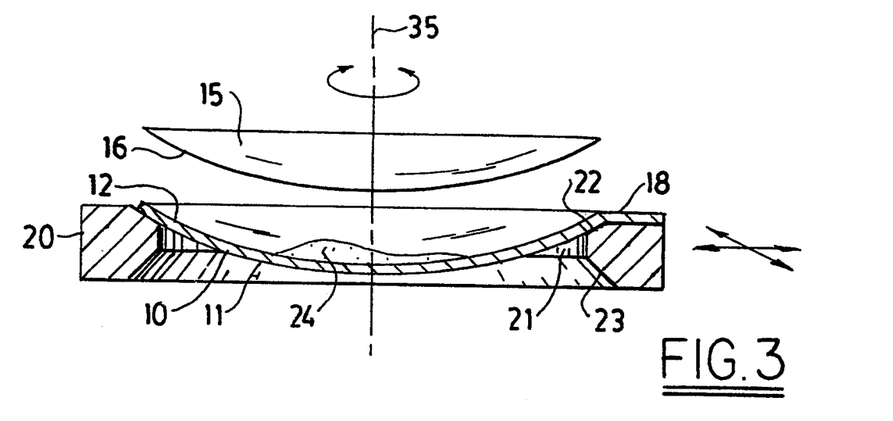
FIGS. 3-5 are partially schematic and partially cutaway views of the front lens and platform of FIG. 1 and the rear lens of FIG. 2 being pressed together for laminating purposes.

Front lens 10 has a convex front surface 11 supported on a platform 20 and a concave rear interface surface 12. Rear lens 15 has a convex front interface surface 16 and a concave rear surface 17 that is mounted on a holder 30 for laminating purposes. Front lens 10 can include a bifocal region 13, which can also be formed as a progressively variable focal region. Bifocal region 13 is normally below the horizontal and can be variably positioned relative to a horizontal axis 14. I prefer that front lens 10 have a tab or projection 18 extending outward from its otherwise circular periphery and that tab 18 be received in a recess 19 in platform 20 to assure that front lens 10 has its bifocal region 13 properly oriented on platform 20. This is especially desirable for a progressive lens that does not have a clearly visible bifocal region.

As explained more fully below, platform 20 is mounted on a stage 27 that is movable in X and Y directions for proper location of front lens 10 relative to laminating axis 35. This is especially important for positioning bifocal region 13 in a desired location relative to the optical center of the composite lens, which is normally positioned directly in front of the pupil of the eye of the wearer, and is also made to coincide with optical axis 35.

Figure 5:
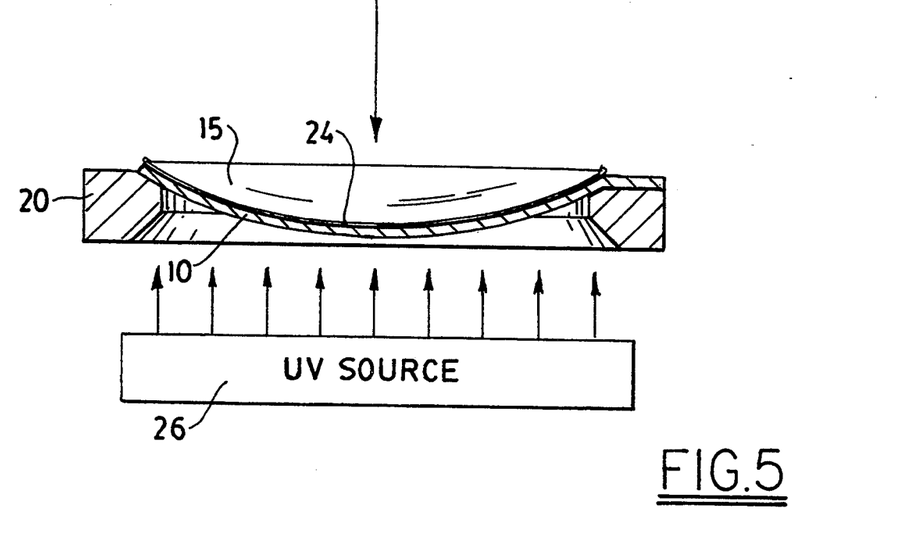

Platform 20 has a circular opening 21 that allows adhesive curing radiation to pass through platform 20 and front lens 10 to cure an adhesive bonding front and rear lenses together, as shown in FIG. 5. While this and the rest of the laminating process occurs, platform 20 supports the periphery of front lens 10 on an angled support surface 22 formed around central opening 21. Platform 20 is preferably invertable and preferably has another support surface 23 formed opposite surface 22 on the other side of platform 20 at a slightly different angle, for supporting a lens 10 with a different curvature of front surface 11. Platform 20 can then be flipped over on its mounting stage to dispose the appropriate one of the support surfaces 22 and 23 for receiving a particular front lens 10.

Rear lens 15 can include an astigmatism correction, and this involves a cylindrical component formed on the rear surface 17 of rear lens 15 along a cylindrical axis 25. Axis 25 must be rotationally oriented relative to front lens 10 to make the appropriate optical correction for the user, and this involves rotationally adjusting rear lens 15 around laminating axis 35. It is also desirable to locate the optical center of rear lens 15 on laminating axis 35 and to position bifocal region 13 of front lens 10 accurately relative to laminating axis 35 so that the optical center of the composite lens coincides with laminating axis 35 and is properly positioned in front of the pupil of the user's eye. How rear lens 15 is properly positioned for bonding to front lens 10 is explained below.

Once properly positioned, rear lens 15 is pressed against front lens 10 with an adhesive 24 interposed between interface surfaces 12 and 16. I prefer that interface surfaces 12 and 16 both be spherical and that they differ slightly in radius to help assure the even spread of adhesive 24 as the interface surfaces are pressed together. Giving interface surface 16 of rear lens 15 a slightly shorter radius of curvature than the radius of curvature of interface surface 12 of front lens 10 makes the engagement between these surfaces begin in their central region and progress toward their peripheries, to ensure even and bubble-free spreading of adhesive 24. The difference in curvature between interface surfaces 12 and 16 is exaggerated in FIG. 4, for illustration purposes, and is preferably less than one-quarter diopter. This is enough, however, to ensure that interengagement of these surfaces proceeds from their centers outward and that adhesive 24 is forced from the center toward the vented peripheries of the interface surfaces and thus spreads evenly without bubbles.

Once the front and rear lenses are pressed together and adhesive 24 is spread evenly between them, as shown in FIG. 5, adhesive 24 is cured while the lenses are held in a pressed-together position. For currently preferred adhesives, curing is accomplished with ultraviolet radiation, as schematically shown by the arrows in FIG. 5 emanating from a UV light source 26. Curing adhesive 24 while lenses 10 and 15 are pressed together assures that their desired interrelationship is maintained in the finished composite lens. Previous laminating systems pressed the lenses together to spread the adhesive between them and then removed the lenses from the pressing apparatus for curing the adhesive elsewhere. This caused defects when the interface surfaces 12 and 16 separated before the adhesive cured. Practical manufacturing tolerances and the flexibility of the lenses themselves allow this problem to occur frequently so that the improperly bonded lenses are discarded and the process is repeated with a new set of lenses.

A preferred laminator 40 for accomplishing the lamination described above is shown in FIGS. 6–8. It includes rear lens holder 30 and front lens platform 20 arranged on laminating axis 35. This is preferably oriented vertically, as assumed in the following description, but could possibly be at other orientations. Laminator 40 otherwise includes a base 41, a platform stage 27 that is movable in X and Y directions, a support 42, a head 43 that is movable vertically on support 42, and a head sleeve 44 supporting a rotationally adjustable and vertically movable column 45. Laminating axis 35 is preferably coaxial with column 45 to provide a reference for properly positioning and orienting the front and rear lenses.

Holder 30 is removable from and reattachable to column 45, preferably by a quickly activated clamp or set screw device 31; and the interconnection between holder 30 and column 45 is preferably configured so that holder 33 mounts in only one angular orientation on column 45. Holder 30 is then rotationally adjustable around laminating axis 35 by rotating column 45 relative to sleeve 44. For this purpose, an angular indicator 46 mounted on column 45 turns relative to a pointer 47 on sleeve 44 so that the desired angular orientation of holder 30 can be indicated and established. This orientation is then held by set screw 48, or other clamping device.

A collar 49 limits downward movement of column 45 relative to sleeve 44, and column 45 and holder 30 are shown in their lowermost position relative to sleeve 44 in the illustration of FIG. 6. As lamination occurs, head 43 is lowered on support 42 until rear lens 15, carried on holder 30, presses against front lens 10, carried on platform 20. I prefer that gravity be used to provide the pressure forcing the lenses together; and this is accomplished by using the weight of holder 30, column 45, and an adjustable series of weights 39 stacked on column 45 above collar 49. Then, it is only necessary to lower head 43 far enough so that the resistance of a front lens 10 on platform 20 stops the downward movement of holder 30 and lets sleeve 44 move downward on column 45 below collar 49. Once this occurs, head 43 need not be lowered any further, because the weight of column 45 and holder 30, together with a preselected number of weights 39, then provides the downward force applied to press the lenses together. This is preferably on the order of a few pounds. It is also simpler and more reliable than pneumatic, hydraulic, or spring mechanisms, which might be used to produce a corresponding force pressing the front and rear lenses together.

The proper mounting of rear lens 15 on holder 30 is preferably done with the aid of three alignment or registration pins 32 arranged along a line 25 parallel with the cylindrical axis of rear lens 15. Three pressure feet 36 are arranged on holder 30 to engage the concave rear surface 17 of rear lens 15, to support lens 15 in a proper position on laminating axis 35, and to properly apply pressure forcing rear lens 15 against front lens 10 for bonding purposes. The mounting of rear lens 15 on holder 30 is preferably done while holder 30 is removed from column 45. Holder 30 is then oriented with pressure feet 36 and alignment pins 32 extending upward so that an operator can place rear lens 15 down onto pressure feet 36. These are covered with an adhesive material or a double-sided adhesive tape arranged so that rear lens 15 can be stuck onto pressure feet 36 and held adhesively until laminated to front lens 10. Then the composite lens can be pulled away from the adhesive on pressure feet 36.

Before mounting rear lens 15, the operator examines rear lens 15 with a lensometer that makes three removable ink marks on rear lens 15. The three ink marks are aligned, with the center mark being on the optical center of lens 15, and the line of the three marks being parallel with the cylindrical axis of lens 15.

The three locator pins 32 are arranged on head 30 to register with the three ink marks so that the operator can place rear lens 15 properly on holder 30 by registering the three ink marks with the points of registration pins 32. These are spring biased by a light spring pressure, as schematically shown in FIG. 6, so that once the ink marks are aligned with registration pins 32, it is merely necessary to press rear lens 15 against pressure feet 36. This adhesively tacks rear lens 15 to feet 36, with registration pins 32 retracted against their spring bias. Pressure feet 36 preferably have pivotally mounted ends that can accommodate to different curvatures of the rear surfaces 17 of different rear lenses 15; and pressure feet 36 are also preferably spring biased, again as schematically illustrated in FIG. 6, to adjust to the curvature of lens 15 as is pressed against lens 10.

Pressure feet 36 are preferably arranged in a triangle as illustrated, with a line between two of the feet 36 being parallel with registration pins 32 and the cylindrical axis of rear lens 15. The remaining pressure foot 36 is preferably arranged across the line of locator pins 32, and thus across the cylindrical axis from the other two pressure feet. The cylindrical component of rear lens surface 17 forms a slight trough extending along the line of pins 32. I prefer keeping pressure feet 36 out of this trough, and I prefer positioning pressure feet 36 so that two of the feet are close to the cylindrical component and parallel with it and the other foot is across the cylindrical component and farther from the cylindrical component, to afford an optimum three-point support. Such an arrangement of pressure feet allows a rear lens to be pressed against the front lens with uniformly distributed pressure, in spite of the cylindrical component formed in the curvature of the rear surface 17 of the rear lens 15.

Figure 4:
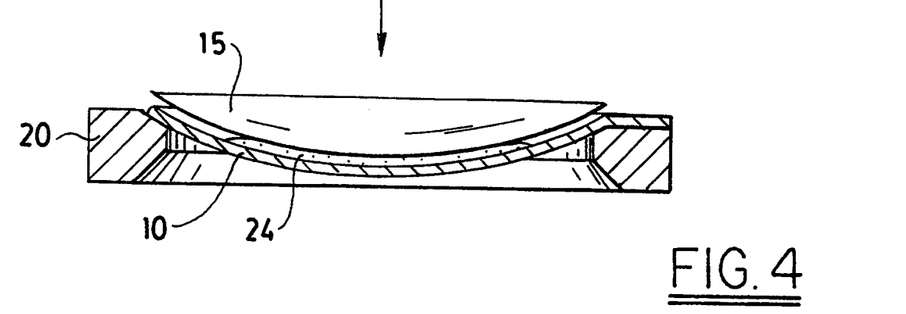

Once rear lens 15 is properly positioned on holder 30, as shown in FIG. 8, holder 30 is reclamped onto column 45. Then, holder 30 is turned to the desired angular orientation on axis 35 and is clamped in rotational place in this orientation. Then, adhesive 24 is applied to the concave interface surface 12 of front lens 10, and head 43 is lowered to move holder 30 downward and bring the lenses into initial contact, as shown in FIG. 4. The operator continues lowering head 43, while observing through rear lens 15 that adhesive 24 is flowing uniformly, without bubbles, toward the peripheries of the lenses. The spacing of pressure feet 36 allows room for this observation. Lowering of head 43 also removes the support of sleeve 44 from under collar 49 so that the gravitational weight of column 45, with head 30 and weights 39, presses the lenses together in their final position, illustrated in FIG. 5. If adhesive 24 appears to be free of bubbles and extends to the peripheries of the lenses (which need not be concentric), then the adhesive can be cured while the lenses are pressed together in laminator 40. This is preferably done by opening a shutter admitting curing radiation from UV source 26 to pass upwardly through front lens 10. Laminator 10 is preferably enclosed while this occurs.

After adhesive 24 is cured, the curing light is blocked from platform 20 and head 43 is raised to move holder 30 upward, bringing the bonded composite lens with it. This is removed by pulling the lens free of the adhesive on pressure feet 36. The composite lens is later trimmed to fit a specific eyeglass frame.

An alternative preferred form of rear lens holder 30A is shown in FIGS. 9–12 and 15–18. It involves a different arrangement of pressure feet for distributing bonding pressure more evenly over the rear surface 17 of rear lens 15. This is especially important for lenses 15 that are made especially thin or of especially flexible material.

Holder 30A mounts on column 45 in the same way as holder 30 and accomplishes the same functions as previously described for holder 30. Holder 30A differs in the way it grips the rear face of rear lens 15 and in the way it applies bonding pressure to the rear face of rear lens 15.

Figure 13:
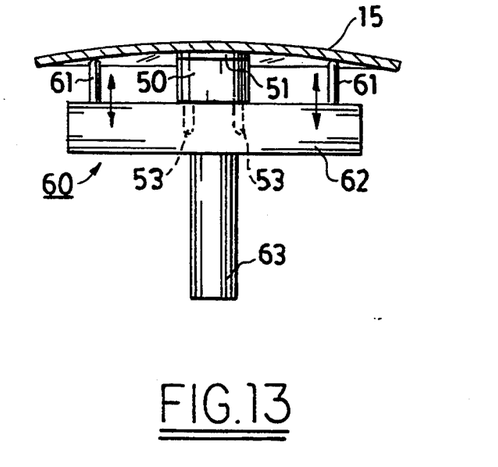
FIG. 13 is a partially schematic side elevational view of a mounting tool arranged for properly positioning a rear lens on the center foot.
Figure 14:
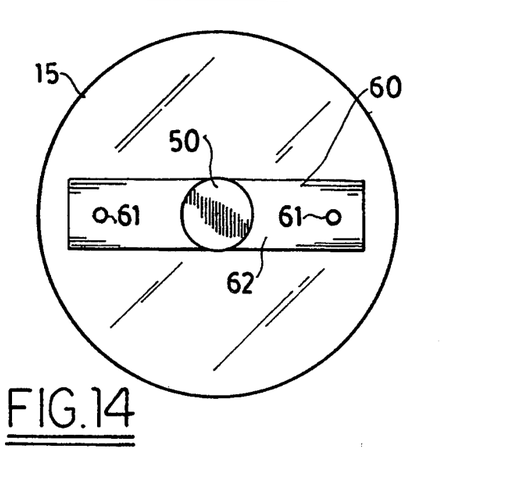
FIG. 14 is a partially schematic plan view of the mounting tool and lens of FIG. 13.

Instead of rear lens 15 being releasably adhered to the three pressure feet of holder 30, rear lens 15 is held to holder 30A by a tacky adhesive face 51 of a single center foot 50 that is preferably concentric with the optical axis extending through column 45 and holder 30A. The tacky adhesive face 51 of center foot 50 can be formed of an adhesive layer or a double-sided tape, and center foot 50 is preferably removable from a center mount 52 on holder 30A. Center foot 50 preferably contains a magnet 55 that allows releasable attachment to center mount 52 and to a mounting tool 60, as shown in FIGS. 13 and 14. Center foot 50 also has a pair of alignment pins 53 that fit into corresponding alignment holes 54 in center mount 52 and in mounting tool 60. Pins 53, or some alternative alignment configurations, align center foot 50 with the cylindrical axis of rear lens 15 when rear lens 15 is attached to center foot.50 with the aid of mounting tool 60, and this alignment with the cylindrical lens axis is transferred to holder 30A when center foot 50 is positioned on center mount 52. Such alignment ensures that the cylindrical axis of rear lens 15 has a predetermined orientation with holder 30A so that rear lens 15 can be properly oriented relative to front lens 10.

Mounting tool 60 includes alignment pins 61 that serve a function similar to pins 32 on holder 30. Pins 61 are advantageously incorporated in mounting tool 60, as shown in FIGS. 13 and 14, where they are removed from the rear lens holder and thus simplify its structure. Pins 61 are axially biased by light spring pressure and are preferably mounted on a beam 62 that can be held by a handle 63 of tool 60. The marks made on rear lens 15 representing the optical center and the line of the cylindrical axis can then be aligned with center foot 50 and alignment pins 61, and then rear lens 15 can be adhesively tacked to center foot 50, simply by pressing lens 15 toward tool 60. Once lens 15 is adhesively tacked to center foot 50, it can be removed from mounting tool 60, along with center foot 50, and mounted on center mount 52 of holder 30A. This is possible because magnet 55 readily releases center foot 50 from mounting tool 60 and reattaches center foot 50 to center mount 52, and because alignment pins 53, which are aligned with the cylindrical axis of rear lens 15, transfer this alignment to center mount 52 as pins 53 enter alignment holes 54.

Besides holding rear lens 15 on adhesive surface 51 of center foot 50, rear lens holder 30A applies bonding pressure uniformly against the rear face 17 of rear lens 15. This is done by a division of the applied pressure between center foot 50 and a plurality of surrounding pressure feet 70. Four pressure feet 70 are illustrated for holder 30A, but different numbers of pressure feet are possible. Pressure feet 70 are also movable axially of holder 30A and are held against axial movement by a locking mechanism such as setscrew 71 that engages a leg 72 of one of the pressure feet 70. All of the legs 72 of the array of pressure feet 70 are preferably connected to a ring 73 that is movable axially within holder 30A. This allows pressure feet 70 to be raised and lowered as a group relative to center mount 52 for center foot 50. Pressure feet 70 are elevated when rear lens 15 and center foot 50 are mounted on center mount 52, and then pressure feet 70 are lowered into engagement with rear surface 17 of rear lens 15. In either a raised or lowered position, pressure feet 70 can be held in place by tightening setscrew 71.

An array of pressure feet 70 arranged around center foot 50 generally improves the uniformity of distribution of bonding pressure to the rear surface 17 of rear lens 15. However, experience shows that more of the gravitational pressure is applied to center foot 50 than to surrounding pressure feet 70, and center mount 52 has a device to compensate for this so as to distribute the applied pressure more uniformly. An axially movable pin 56 is arranged concentrically within center mount 52 to engage magnet 55 in center foot 15. Axial movement of pin 56 can then adjust the axial position of center foot 50 relative to pressure feet 70.

Figure 15:
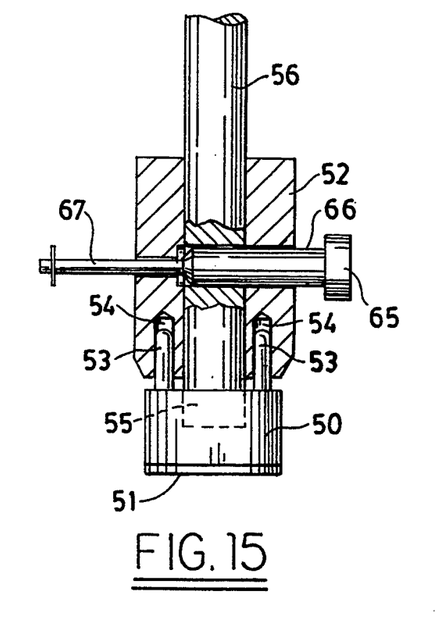
FIG. 15 is a partially schematic and partially cutaway view of the adjustable connection of the center foot to the rear lens holder in an initial position.
Figure 16:
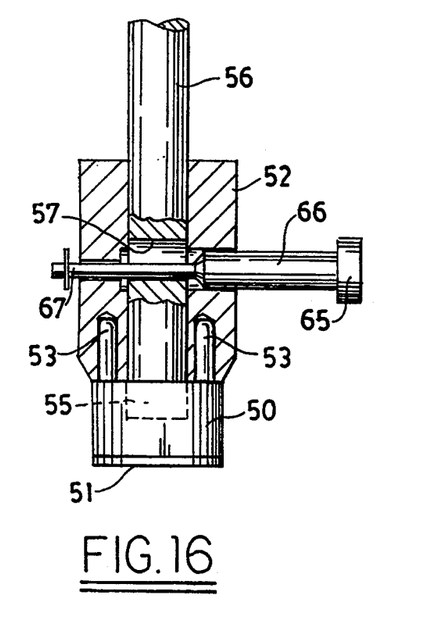
FIG. 16 is a partially schematic and partially cutaway view, similar to the view of FIG. 15, showing the center foot in a pressure relieved position on the rear lens holder.
Figure 17:
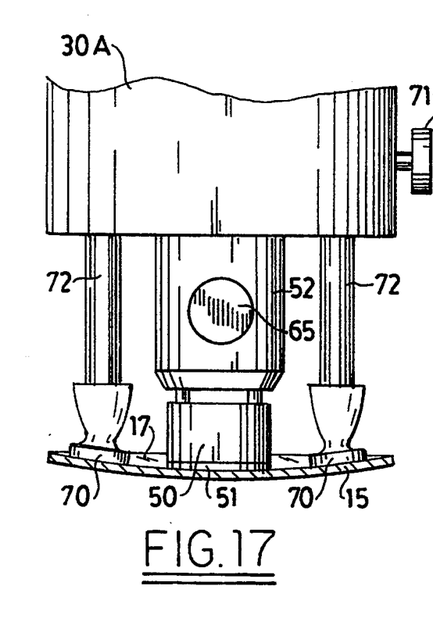
FIG. 17 is a partially schematic and fragmentary view of the holder showing the rear lens and center foot in an initial position corresponding to FIG. 15.
Figure 18:
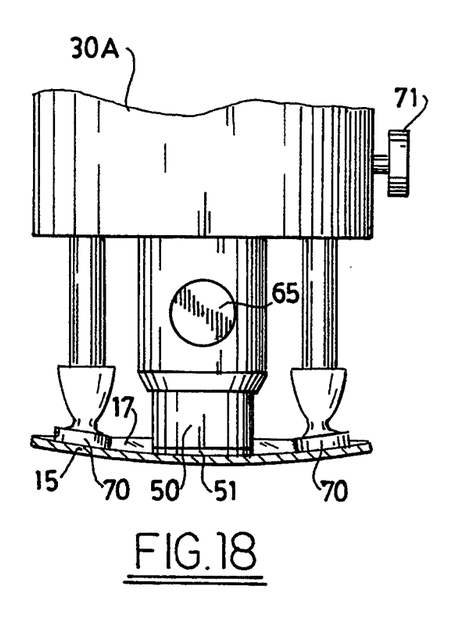
FIG. 18 is a fragmentary and partially schematic view, similar to the view of FIG. 17, and showing the rear lens and center foot in a pressure relieved position corresponding to the view of FIG. 16.

A movable element in the form of a cross pin 65 having a large diameter 66 and a small diameter 67 extends through a bore hole 57 in axial pin 56. When the larger diameter 66 of cross pin 65 is positioned within bore hole 57, pin 56 is held to an initial and lowermost position in center mount 52, as shown in FIGS. 15 and 17. This in turn positions center foot 50 in an initial lowered position. When cross pin 65 is moved to dispose its smaller diameter 67 in bore hole 57, axial pin 56 and center foot 50 are allowed to rise to an upper position shown in FIGS. 16 and 18. The difference between the upper and lower positions of center foot 50 caused by movement of pin 65 is preferably about equal to the compressive deformation of tacky adhesive 51 pressing against lens surface 17.

The operation of holder 30A and mounting tool 60 is preferably as follows. After rear lens 15 is marked with three marks applied in a lensometer to represent the optical center and a line parallel with the cylindrical axis, rear lens 15 is positioned over mounting tool 60 so that these marks align with pins 61 and center foot 50, which is magnetically mounted on tool 60. Lens 15 is then pressed against the tacky adhesive surface 51 of center foot 50.

Rear lens 15, with adhesively attached center foot 50, is then transferred to center mount 52 of holder 30A by sliding locator pins 53 into holes 54 so that magnet 55 removably attaches center foot 50 to axially movable pin 56, which is set in its lowermost position as shown in FIGS. 15 and 17. Surrounding pressure feet 70, which are held in an elevated position while lens 15 is mounted on center mount 52, are then lowered into engagement with the rear surface 17 of rear lens 15 and are clamped in the lowered position by tightening setscrew 71. Then pin 65 is moved to allow center foot 50 to rise to its upper position shown in FIGS. 16 and 18 so that the pressure applied to lens 15 is distributed more evenly between pressure feet 70 and a slightly elevated center foot 50.

From this point on, the bonding process proceeds as previously described, with the application of adhesive 24 and the lowering of rear lens 15 into engagement with adhesive 24 on front lens 10. The plurality of pressure feet 70 cooperating with center foot 50 and evenly distributing the gravitational pressure to the rear surface 17 of rear lens 15 makes the bonding more reliable and distortion free, especially for thinner and more flexible rear lenses 15.

I claim:

1. A composite eyeglass lens laminating holder comprising:
   a. a center foot having a tacky adhesive face adhered to a rear surface of a rear lens at an optical center of the rear lens so that the center foot and the rear lens are mountable on a laminating axis passing normally through the optical center; and
   b. a plurality of pressure feet arranged around the center foot and movable relative to the center foot in the direction of the laminating axis, the position of the pressure feet being setable relative to the center foot to distribute bonding pressure force applied to the rear face of the rear lens.

2. The holder of claim 1 wherein the center foot includes a magnet that holds it in mounted position.

3. The holder of claim 2 including a mounting tool that receives the center foot between a pair of locator pins arranged on a line through the center foot, for mounting the rear lens on the tacky adhesive face of the center foot.

4. The holder of claim 1 wherein a predetermined line through the center foot registers with a predetermined line intersecting the laminating axis.

5. The holder of claim 1 including a movable element that adjusts the position of the center foot relative to the pressure feet in the direction of the laminating axis.

6. The holder of claim 1 arranged on a column movable in the direction of the laminating axis for applying gravitational pressure to bond the rear lens to the front lens.

7. A rear lens holder for a composite eyeglass lens laminator, the rear lens holder comprising:
   a. a center foot removably mountable on the laminator;
   b. an array of pressure feet arranged around the center foot;
   c. the center foot having a tacky adhesive surface engaging a rear face of the rear lens at the optical center of the rear lens through which a laminating axis extends;
   d. the array of pressure feet being movable relative to the center foot in the direction of the laminating axis and being lockable in different positions along the direction of movement; and
   e. the center foot and the array of pressure feet being rotatable around the laminating axis and movable along the laminating axis.

8. The holder of claim 7 wherein the position of the center foot on the laminating axis is adjustable relative to a locked position of the array of pressure feet.

9. The holder of claim 7 including a support for the array of pressure feet and for receiving the center foot and the rear lens, the support being rotatable around the laminating axis and movable along the laminating axis.

10. The holder of claim 9 including an element movably arranged within the support for adjusting the axial position of the center foot relative to the array of pressure feet.

11. The holder of claim 9 including alignment elements for mounting the center foot on the support so that a line through the center foot registers with a predetermined line intersecting the laminating axis.

12. The holder of claim 9 wherein the center foot includes a magnet that removably mounts the center foot on the support.

13. A system for distributing pressure over the rear face of a rear lens mounted on a holder of a composite eyeglass lens laminator, the system comprising:
   a. a center foot engaging an optical center of the rear lens and aligned with a cylindrical axis of the rear lens;
   b. the center foot being attachable to the holder to position the optical center of the rear lens on laminating axis through the optical center and to orient the cylindrical axis of the rear lens in a predetermined direction relative to the holder; and
   c. an assembly of pressure feet engaging regions of the rear face of the rear lens around the center foot, the pressure foot assembly being movable relative to the holder and being lockable in different positions relative to the holder, and the center foot being movable along the laminating axis to adjust the holder pressure applied to the center foot relative to the holder pressure applied to the pressure feet.

14. The system of claim 13 wherein the center foot is configured with an alignment structure that interengages with the holder.

15. The system of claim 13 wherein the center foot includes a magnet that attaches the center foot to the holder.

16. The system of claim 13 including a mounting tool that receives the center foot between a pair of alignment pins that orient the rear lens on the center foot.

* * * * *